Jan. 6, 1970     D. C. BROWN     3,487,547

SELF-CALIBRATING MULTILATERATIVE PLATE COMPARATOR

Filed April 10, 1968     2 Sheets-Sheet 1

INVENTOR
DUANE C. BROWN

BY *Hurvitz, Rose & Greene*

ATTORNEYS

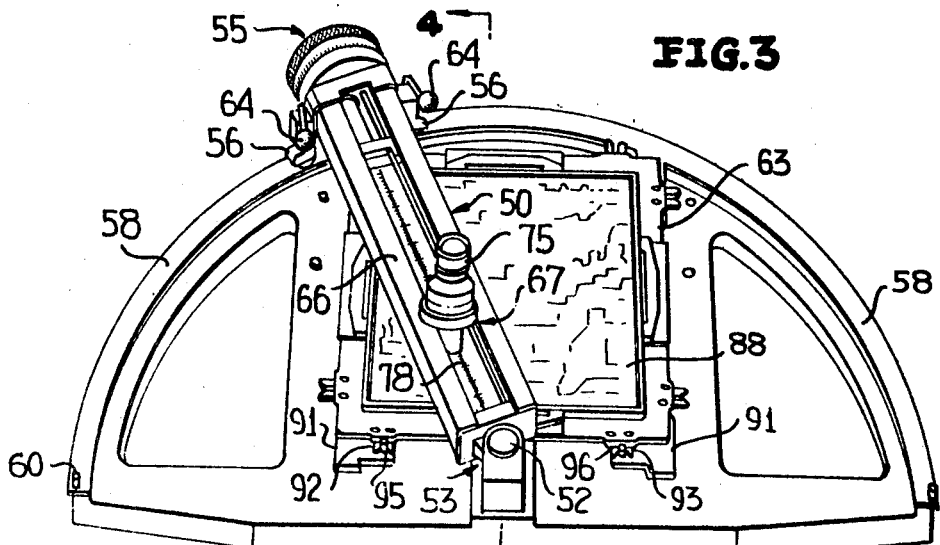
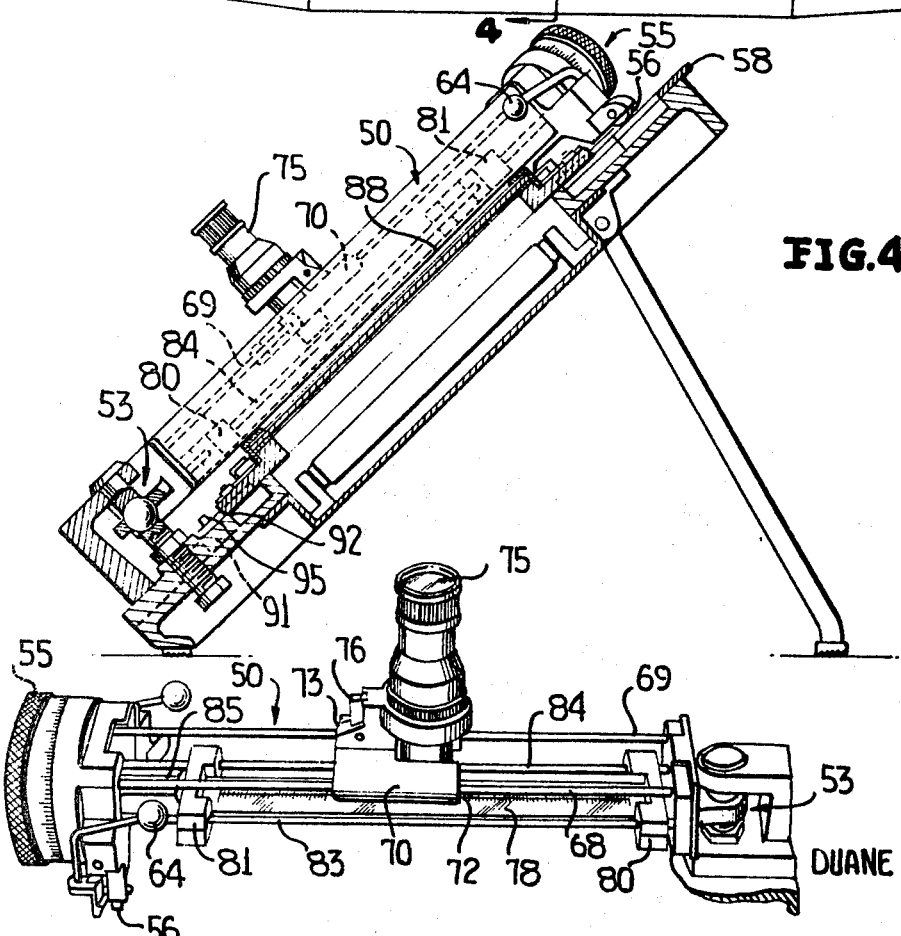

United States Patent Office 3,487,547
Patented Jan. 6, 1970

3,487,547
SELF-CALIBRATING MULTILATERATIVE
PLATE COMPARATOR
Duane C. Brown, Indialantic, Fla., assignor to D. Brown
Associates, Inc., Eau Gallie, Fla., a corporation of
Florida
Filed Apr. 10, 1968, Ser. No. 720,188
Int. Cl. G09b 29/10
U.S. Cl. 33—1                               7 Claims

ABSTRACT OF THE DISCLOSURE

The coordinates of predesignated points on a plate, such as a photographic plate or chart containing surveying or mapping information, are obtained by pivoting a graduated scale across the face of the plate through a plane parallel thereto about a pivot point external to the plate until an intersection occurs between a selected one of the predesignated points and the scale, recording the scale reading for that point, repeating the process until scale readings are obtained for each of the predesignated points for a particular pivot point of the scale; relatively rotating the scale and the plate to provide successive different pivot points for the scale relative to the plate, and recording scale readings for each of the predesignated points for each of the different pivoted positions of the scale relative to the chart.

BACKGROUND OF THE INVENTION

The present invention relates generally to systems and methods for the determination of the position of one or more points on a plate, chart, photograph, plan or the like within a predetermined coordinate system, and more particularly, to such a determination in which position of points relative to a plurality of fixed tracking stations, at least some of whose coordinates are also unknown, is to be ascertained.

The conventional plate comparator is a relatively massive instrument, typically weighing from 200 to 300 kilograms; yet despite its bulkiness is rather delicate, requiring substantial precautionary measures in its use and its conveyance from place to place. Among its structural requirements is the provision of precisely linear and precisely orthogonal ways or guides establishing an x–y coordinate system.

Before entering into any discussion of the objects and advantages of the present invention, and a brief summary of its structural character, it is well to consider the concepts and principles underlying its development. The problem of measuring the precise coordinates of a set of points on a plate may be considered as equivalent to a two-dimensional tracking problem. In the idealized four station ranging system of FIGURE 1, tracking stations 11, 12, 13 and 14 are assumed for the moment to be of known location, and the coordinates $(x_j, y_j)$ of a target 15 are to be determined. Target or image 15 is positioned at a particular instant of time at an arbitrary point, captured on plate 10, relative to stations 11–14 which are fixedly positioned at points external to plate 10 having coordinates $x_i{}^c, y_i{}^c$, $i=1, 2, 3, 4$. The location of target 15, i.e. its coordinates $x_j, y_j$, are determinable from measurements of distance or range $r_{ij}$ from the four fixed external points 11–14, using the following set of four observational equations:

$$r_{1j}{}^2 = (x_j - x_1{}^c)^2 + (y_j - y_1{}^c)^2$$
$$r_{2j}{}^2 = (x_j - x_2{}^c)^2 + (y_j - y_2{}^c)^2$$
$$r_{3j}{}^2 = (x_j - x_3{}^c)^2 + (y_j - y_3{}^c)^2$$
$$r_{4j}{}^2 = (x_j - x_4{}^c)^2 + (y_j - y_4{}^c)^2 \qquad (1)$$

Since the locations of the tracking stations 11–14 are known, by initial assumption, and the ranges $r_{ij}$ are considered to be known by virtue of measurement, there is left the simple solution of a system of four equations in but two unknowns, the desired coordinates $x_j, y_j$. A least squares adjustment may be performed to minimize the effects of random measuring errors, resulting also in an error propagation associated with the adjusted coordinates. It can be shown that if the plate format were square, and the tracking stations located near the midsides of the format, for a specified standard deviation $\sigma$ of ranging, the standard deviations of $x_j, y_j$ obtained from a least squares adjustment will range in magnitude from $0.71\sigma$ for centrally located points to $0.85\sigma$ for points near the edges of the format. In essence, then the basic measuring accuracies are geometrically enhanced throughout the format, rather than diluted, and the geometrical variation of accuracies of plate coordinates is acceptably small.

If the original assumption that the coordinates of the tracking stations are known is removed, the coordinate system which was previously implicitly defined by such assumption now becomes a matter of choice. By judicious selection of the coordinate system it is possible to render some of the coordinates of the tracking stations known as a matter of definition. For example, the coordinate system may be defined as right-handed with the positive $y$ axis passing through points 11 and 13, thereby setting $x_1{}^c = x_3{}^c = 0$, and with the origin chosen to render the $y$ coordinates of points 12 and 14 equal in magnitude but of opposite sign (i.e. $y_2{}^c = -y_4{}^c$). This choice has the additional advantage of placing the origin of the coordinaate system near the center of the plate.

It follows from this definition of the coordinate system and withdrawal of the original assumption of knowledge of station coordinates, that in the set of four Equations 1 above, arising from the measurements of the $j$th point (designated by reference number 15), there now exist five unknown coordinates of the tracking stations, viz., $y_1{}^c, x_2{}^c, y_2{}^c, y_3{}^c, x_4{}^c$, in addition to the unknown coordinates $x_j, y_j$ of that point. This results in a system of four equations in seven unknowns, and a unique solution does not exist. However, considering the entire system of equations generated by the measurements of $n$ distinct points on the plate, it will be observed that it involves $4n$ equations in a total of $5+2n$ unknowns (the 5 station coordinates and the $x_j, y_j$ for each of the $n$ points, $j=1, 2 \ldots, n$). It is clear that when $n \geq 3$ the number of equations exceeds the number of unknowns, and a solution may be attempted.

Simultaneous adjustment of the observations from all $n$ points generates a system of normal equations of order $(2n+5) \times (2n+5)$, and hence such a system increases with increasing $n$. However, the normal equations have a highly patterned structure that may be exploited in the data reduction to develop an algorithm by which the computational effort for the formation and solution of the normal equations increase only linearly with the number of points being carried. Moreover, the largest matrix operation to be performed is the inversion of a matrix of order equal to the number of error parameters being recovered. In the present problem, the error parameters to be recovered consist of the five unknown coordinates of the tracking stations, and therefore the general system of normal equations can efficiently be collapsed to a 5 x 5 system involving only the station coordinates as unknowns. After the latter have been determined, the coordinates of the points $x_j, y_j$ can be established through the solution of $n$ independent 2 x 2 systems of reduced normal equations.

An important question remains to be answered in respect to whether the recovery of station coordinates leads to significant dilution of accuracies in the recovery of image coordinates. In response to this question, it can be shown that when about 25 well-distributed points are carried in the solution, the expected accuracies of the $x_j$, $x_j$ are degraded only by from 5 to 15 percent over what they would have been had all coordinates of the tracking stations been perfectly known. It is to be emphasized that this is a degradation of accuracy, not of absolute measurements. By way of example, if one could expect an accuracy of determination of location of a given point within 0.0100 percent of its actual location when all tracking station coordinates were known, the lack of the latter information serves only to reduce that accuracy to a figure of from 0.0105 percent to 0.0115 percent. In addition, the more points carried in the reduction, the less the dilution of accuracies entailed by the need for recovering station coordinates. This indicates that by virtue of a data reduction tradeoff, the development of the comparator of the present invention need not be concerned with problems relating to precise location of points that would correspond to fixed points of observation (hereinafter sometimes termed "pivot points"), clearly an extremely important result.

As will be discussed in greater detail in the description of a preferred embodiment, the fact that the coordinates of the observation points need not be known is a vital factor in the practical implementation of the measuring process. As a very rough approximation, the process can be envisioned as involving the pivoting of a transparent scale about its zero point to sweep across the entire plate. With the provision of some manner of interpolation between divisions of the scale, coordinates of the pivot points and all points of interest on the plate could be determined. Following the measurement of all points from one pivot point, the scale could be removed to a second pivot point and the process repeated, these steps being continued until measurements are obtained from all four pivot points. Clearly, shifting of the scale from pivot to pivot is undesirable from the standpoint of providing a practical device from which accurate measurements might be rapidly obtained, and fortunately, since the coordinates of the pivot points need not be known, a geometrically equivalent process of substantially greater desirability emerged. The equivalent process consists of pivoting the scale about a single point and rotating the plate by nominally 90 degrees between one set of measurements and another. This generates a total set of measurements exactly equivalent to the set that would have been produced from a fixed plate and four separate pivots as discussed earlier, and from a mechanical point of view is a much more feasible process to implement.

Yet another problem is encountered. While fixing the pivot of the scale and rotating the plate between sets of measurements are advantageous, accuracies of the order of one micron are sought and the physical difficulties of pivoting precisely about the zero mark of the scale or about any precisely known point are not easily resolved. If it is assumed that the location of the pivot relative to the zero mark of the scale is completely unknown and is to be recovered in the reduction, the system becomes geometrically equivalent to that shown in FIGURE 2. Referring to that figure, the symbols $\alpha$ and $\beta$ denote the radial and tangential components, respectively, of the offset of the pivot point relative to the zero mark of the scale. Because there is but a single pivot point and one measuring arm, the same $\alpha$ and $\beta$ apply to all four measuring stations.

The measured range $r_{ij}$ now consists of the distance from the zero mark of the scale, e.g. designated by reference numeral 21 in FIGURE 2, to the point 15 whose coordinates are $x_j$, $y_j$. On the other hand, the range from the tracking station to $(x_j, y_j)$, which is the measurement of interest, is given by the hypotenuse of a right triangle having sides of length $(r_{ij}+\alpha)$ and $\beta$, respectively. Accordingly, and continuing with the previous choice of coordinate system, the set of observational equations from measurements of the $j$th point is:

$$(r_{1j}+\alpha)^2+\beta^2=x_j^2+(y_j-y_1^c)^2$$
$$(r_{2j}+\alpha)^2+\beta^2=(x_j-x_2^c)^2+(y_j-y_2^c)^2$$
$$(r_{3j}+\alpha)^2+\beta^2=x_j^2+(y_j-y_3^c)^2 \quad (2)$$
$$(r_{4j}+\alpha)^2+\beta^2=(x_j-x_4^c)^2+(y_j+y_2^c)^2$$

With the exception of the presence of new parameters $\alpha$ and $\beta$, this system of Equations 2 is of the same form as that in which the coordinates of the pivot points were assumed to be known. Measurements of $n$ points again generate a system of $4n$ equations, but the number of unknowns is increased to $2n+7$ as a consequence of the terms $\alpha$ and $\beta$. The solution has the same properties as before, except that the reduced normal equations are now of order 7 x 7 to determine the five unknown pivot point coordinates, as well as $\alpha$ and $\beta$. The coordinates of the points $x_j$, $y_j$ are again established through the solution of $n$ independent 2 x 2 systems of reduced normal equations. As with the investigation into the effect of unknown pivot point coordinates on accuracy of the point measurements, it can be shown that the addition of the offset parameters $\alpha$ and $\beta$ introduce essentially no further dilution of the accuracies of the recovered coordinates $x_j$, $y_j$.

Hence, the design of the comparator need not be concerned with the establishment of the precise offset of the pivot point from the zero mark of the scale, again resulting in a major simplification in mechanization of the device by means of a computational tradeoff. An additional benefit gained by introduction of $\alpha$ as an unknown resides in its compensating automatically for any unknown costant personal bias. For example, the contamination of a given set of measured ranges by the application of a common additive constant would ultimately result in derivation of precisely the same coordinates $(x_j, y_j)$ from independent reductions of both the original and the contaminated sets of measurements. The values obtained for $\alpha$, however, would differ by an amount equal to the additive constant.

Accordingly, among the objects of the present invention, it is principally desired to provide a multilaterative plate comparator having the attributes of simplicity, ruggedness, compactness, and accuracy, and in which the plate or chart containing the points or images of interest is swept over by a transparent scale pivoted about its zero point, or thereabout, substantially corresponding to one of a plurality of pivot points about the periphery of the plate, from which the distances to points of interest on the plate are to be measured.

SUMMARY OF THE INVENTION

Briefly, according to the present invention, a self-calibrating multilaterative plate comparator includes a plateholder having a self-seating frame for holding the plate or chart of interest, a measuring arm pivotally mounted on the support table therefor and arranged for guided motion along an arcuate support rail for sweeping superposed coverage of the entire plate, a scale mounted along the measuring arm, a microscope arranged for sliding or incremental movement over the length of the measuring arm for viewing a point of interest on the plate relative to the scale indicia.

In use, the measuring arm is pivoted across the plate and the microscope is translated along the arm until the point or image of interest lies between a pair of adjacent scale graduations, providing the whole unit portion of the reading. A vernier reading is obtained by adjusting the position of the microscope relative to the lower scale graduation, using a micrometer adjustment at the end of the measuring arm. This procedure is repeated for 90 degree rotations of the plate on the frame, thus providing measurements of each point relative to four different pivot points adjacent to the plate, corresponding to 90°, 180° and 270° orientations of the plate with respect to the original position in which point coordinates were measured. The result is self-calibration through the exercise of sufficient redundancy in measurement, equivalent to a four station, two dimensional least squares quadrilateration.

BRIEF DESCRIPTION OF THE DRAWINGS

The above and still further objects, features and attendant advantages of the present invention will become apparent from a consideration of the following detailed description of a preferred embodiment thereof especially when taken in conjunction with the accompanying drawings, in which:

FIGURE 3 is a perspective view of the comparator taken from the front of the instrument as disposed in its normal operating position;

FIGURE 4 is a fragmentary sectional side view of the comparator of FIGURE 3 taken through its axis of symmetry; and FIGURE 5 is a perspective view of the measuring arm, scale, microscope and associated elements, for the comparator of FIGURES 3 and 4.

DESCRIPTION OF A PREFERRED EMBODIMENT

Figure 1:
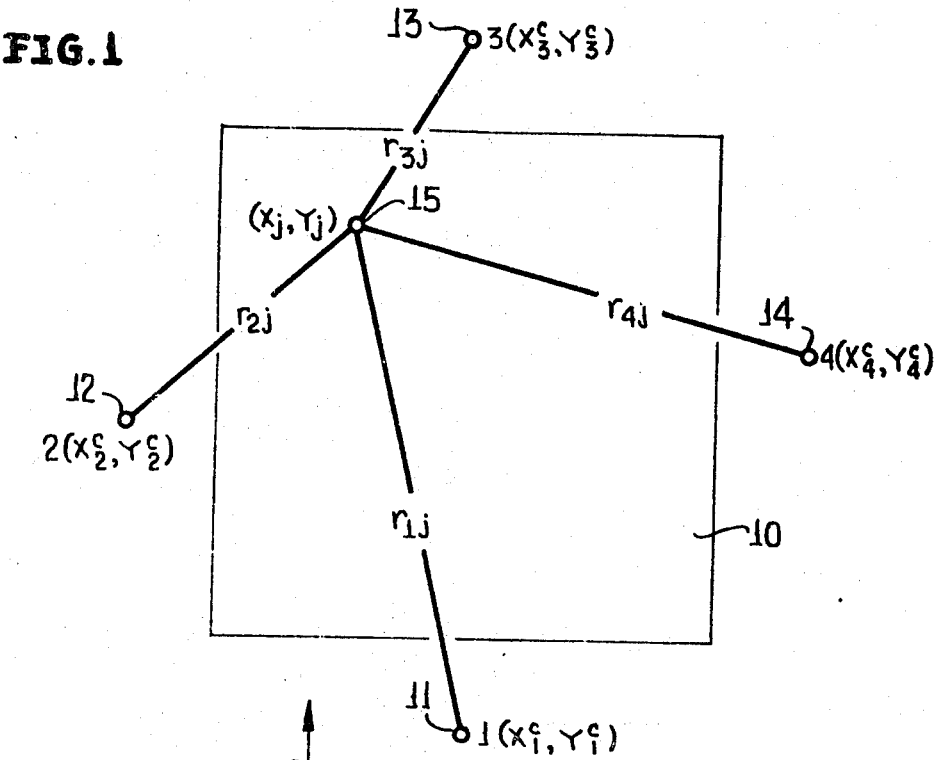
FIGURE 1 is a plan view diagrammatically illustrating the geometry of an idealized, four station, two dimensional system of quadrilateration, described earlier in the discussion of concepts and principles underlying the present invention.
Figure 2:
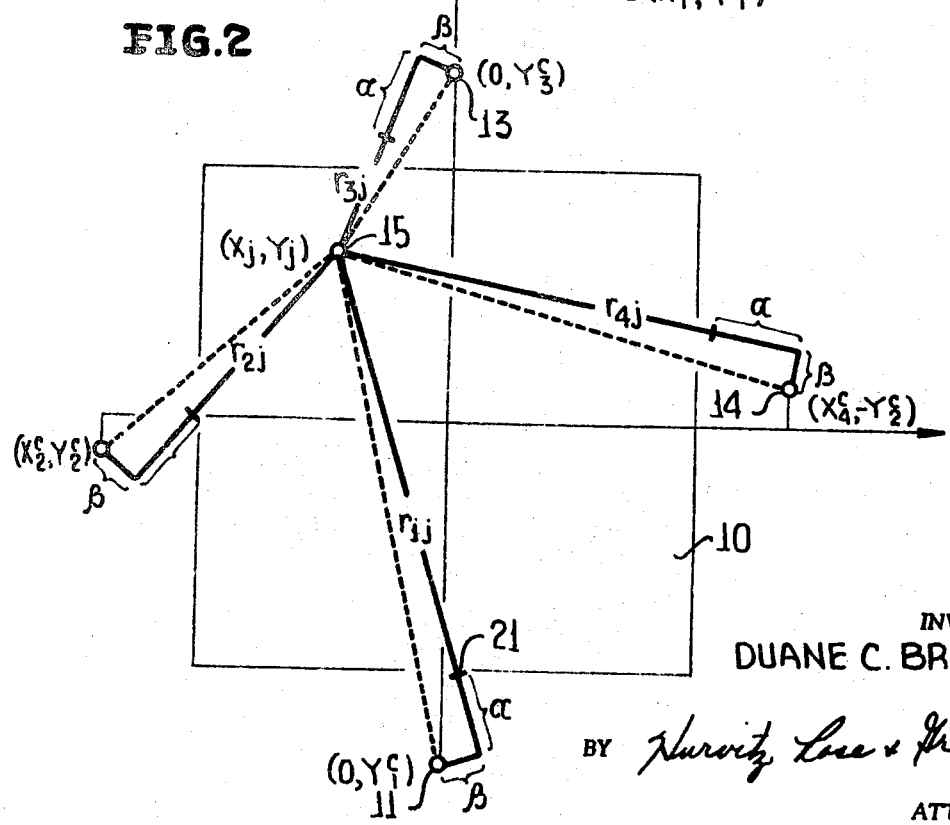
FIGURE 2 is a plan view similar to that of FIGURE 1, illustrating the geometrical equivalent of the comparator system of the present invention, also described earlier.

Referring now to FIGURES 3 and 4, the comparator includes a measuring arm 50 arranged to pivot about a point 52 defined by a ball joint 53 in which a single, top loaded, self-seating ball bearing is retained, and to which the measuring arm is coupled. In a constructed embodiment, the ball bearing had a diameter of 0.75 inch. At the end of the measuring arm remote from its pivotal coupling point 52 a micrometer adjustment 55 is provided, for a purpose to be discussed presently. The micrometer end of arm 50 is supported by a pair of rollers 56 at either side thereof, that run along an arcuate track in the form of a machined guide rail 58. Accordingly, the measuring arm may be pivoted through an arc limited by the stops or pins 60 at either end of the guide rail, and is so retained at its pivotal coupling point and at the guide rail as to swing through a plane parallel to that of a plate holder 63 therebeneath. The measuring arm may be locked at any desired point along the guide rail, i.e., at a desired angular position relative to a chart retained in chart holder 63 such that the point of interest lies along the radial line coincident with the axis of the arm, by releasing either of the dual spring-loaded brake levers 64 when the desired point is attained.

Referring for the moment to FIGURE 5, where a more detailed view of measuring arm 50 is shown with side panels 66, 67 removed, a pair of preferably stainless steel spaced-apart rods 68, 69 extend longitudinally at either side of the upper portion of the arm, relative to the operator, to provide runners along which carriage 70 may ride in translation on sleeve bearings 72, 73. The carriage, on which is mounted a microscope 75 to roll therewith, may be locked at any desired point along arm 50 by releasing a spring-loaded brake lever 76. In a constructed embodiment, the microscope was a Bausch and Lomb zoom microscope (10×→30×).

Attached to the portion of the measuring arm which is to be positioned adjacent or superposed immediately above, the chart or plate retained in plate holder 63, is a scale 78. Referring again to the constructed embodiment, for the sake of example, scale 78 was six millimeters (mm.) thick, 29 mm. wide and 292 mm. long, with graduations along its lowermost side, relative to the chart, at one millimeter intervals over a length of 261 mm., and with every even division numbered. The ends of the scale are fastened to support members 80, 81 which ride on sleeve bearings on another pair of longitudinally extending, spaced-apart stainless steel rods 83, 84. Lower support 80 of the scale is free of the pivotal coupling or ball joint end of the measuring arm, being constrained only to longitudinal translation along rods 83, 84 on its sleeve bearings. The upper support member 81, however, is secured to the nut or shaft 85 of the micrometer screw, which in the exemplary embodiment is two centimeters in length, and is accordingly movable therewith. In consequence, by turning micrometer drum 55 scale 78 is translated radially along the measuring arm, by a precisely proportional and known amount. Automatic stops may be provided in the micrometer head, in a conventional manner, to limit this translation to a desired maximum, preferably one millimeter; and the amount of translation of the scale should be readable from the vernier to the nearest half micron.

The scale is of critical importance to the attainment of the desired measuring accuracy of one micron, along with the micrometer screw and the pivot, of which more will be said later. The glass employed for the scale is of the same type as is used for Kodak (registered trademark of Eastman-Kodak) plates. Incidentally, the stainless steel rods 68, 69, 83, 84 should have approximately the same coefficient of expansion as the glass, to render the comparator relatively insensitive to variations in temperature. One micron accuracies in the recovery of the co-ordinates of points of interest on the plate demand a scale that is either accurate to one micron or is calibrated to an accuracy of one micron.

Referring again to FIGURES 3 and 4, the plate 88 to be measured is mounted in plate holder 63, the four corners of which rest freely on four pads 91 machined to be in the same plane as the upper surface of guide rail 58. Different sizes of plate holders may be utilized to accommodate plates of respective different dimensions. Typical nominal plate dimension are: 9.5 x 9.5 inches, 8 x 10 inches, 290 x 215 mm. Each edge of plate holder 63 has fastened thereto a pair of V-blocks such as 92, 93 that have been mated to a pair of positioning pins 95, 96 permanently attached to the mainframe of the comparator (here at two of the machined pads 91), whereby to secure the plate holder, and thus the plate fastened therein, in each of the four standard positions in which measurements are to be made, as previously explained.

Each plate holder is preferably constructed to accommodate a standard plate thickness, say, .240 inch, to leave a gap of 75 to 100 microns between the upper surface of the plate and the lower surface of the scale adjacent thereto. Such a gap is sufficiently small to permit both the plate and the graduations of the scale to be sharply in focus at the upper magnification of 30× of the microscope. Plate thickness of smaller value which would otherwise increase the size of this gap require the use of shims that attach to the pads on which the plate holder rests, to assure a gap of the aforementioned character.

Preferably, the mainframe includes a built-in light table beneath the plate holder to provide illumination of the plate. Three 8-watt fluorescent lamps have been found sufficient to provide the desired illumination. To permit use of the comparator in a convenient operating position at an angle of approximately 45 degrees relative to the horizontal, as shown in FIGURES 3 and 4, a pair of folding legs is built into the back of the mainframe, offering the necessary support in the extended position, and conveniently collapsed for compact transportation and/or storage of the instrument. Incidentally, special installation of the comparator is not essential to its successful operation nor to the attainment of accuracies of the order recited earlier; rather, any relatively stable base, such as a table top, may be used for supporting the instrument.

With reference again to the elements critical to attainment of the desired measuring accuracy of one micron, the scale has already been discussed, and the micrometer screw and the pivot remain to be discussed in this regard. The micrometer screw is preferably calibrated to an accuracy of ±0.3 micron over its measuring range of one millimeter. In operation the screw is used to produce a translation not exceeding one millimeter, and it is calibrated in 50 micron steps over the working millimeter. The primary requirement of the third critical element of the comparator, the pivot, is that it provide a stationary point of rotation. This point is the center of a 0.75 inch ball bearing having a sphericity of ±0.25 micron. The center of the ball is located in the plane of the scale, thereby making the measurements insensitive to any up and down motion of the far end of the scale. Wobble of the ball bearing is restricted by a spring-loaded thrust bearing that provides a controlled loading against the thrust bracket, with the thrust directed precisely along the axis of rotation.

In operation of the comparator, measuring arm 50 is rotated about pivot point 52, and microscope 75 translated along the measuring arm, to bring any desired point on plate 88 into the field of the microscope. To measure a point, it is brought within a circular reticle having a diameter of 400 microns at plate scale. It is not necessary to precisely center the image within the reticle, since a lateral offset of as much as 100 microns will cause an error in radial distance of only 0.1 micron, at worst. Error attributable to parallax during reading as a consequence of the gap between scale and plate depends upon the effective focal length of the objective which, for the model of microscope mentioned earlier, displays an error of 0.3 micron in radial distance for a 100 micron radial offset.

The image or point observed within the reticle will lie between a pair of graduations (millimeter, in this exemplary embodiment) on the scale. The reading in whole units is taken directly from the lower graduation, relative to the pivot point of the measuring arm, whereas the fractional reading is obtained by rotating micrometer drum 55 to translate that lower graduation until it precisely bisects the image under observation. The fractional reading is recorded against point number and the process micrometer drum, to the nearest half micron. The entire reading is recorded againnst point number and the process is repeated for all points to be measured. After performing all point measurements for a given plate position, the measuring arm is moved to a position which will allow removal of the plate holder from pads 91, rotation of the plate holder (and, of course, the plate with it) by 90 degrees, and replacement on the comparator. The points are again measured and the readings obtained are recorded in the previous fashion, this process continuing until the plate has undergone the final two 90 degree rotations. That is to say, the operation is completed when the plate has been measured in the aforesaid manner in all four positions.

The coordinates of all points, and of the tracking stations (and/or other error parameters or coefficients) are recovered from the recorded data by recourse to solution, on a digital computer, of the system of normal equations obtained in the manner aforesaid.

While I has disclosed a preferred embodiment of my invention, it will be apparent to those skilled in the art to which the invention pertains that variation of the specific details of construction that have been illustrated and described may be resorted to without departing from the spirit and scope of the invention.

I claim:

1. In a method of determining the coordinates of a set of predesignated points on a plate, the steps including sweeping a scale through a plane parallel to that of said plate from a pivot point outside the periphery of said plate until the scale lies along a radial line from said pivot point intersecting one of said predesignated points to obtain a reading from said scale of the location of the intersected point relative to a station in proximity to said pivot point, repeating said scale sweeping and reading steps for each of said predetermined points, rotating said plate relative to said pivot point to provide a new station outside the periphery of said plate from which the distance to each of said predesignated points in said set is to be determined following the obtaining of readings for the locations of said set of predesignated points from the first-mentioned station, and repeating the aforementioned steps until locations of predesignated points relative to at least three distinct and different stations have been determined, the predesignated points whose locations relative to the selected stations are to be determined being sufficient in number to provide a system of simultaneous equations involving coordinates of said points and of said stations wherein the number of equations is at least equal to the number of unknown coordinates, both of the predesignated points and of the stations, for the selected coordinate system.

2. The method of claim 1 wherein said plate is successively rotated about its center to place said pivot point at stations displaced at 90 degree increments from one another for each set of readings of relative locations of said predesignated points.

3. The method of claim 2 wherein said plate is rectangular, and each of said stations is selected to be positioned closely adjacent the midpoint of a different side of said plate.

4. The method of claim 3 wherein each said station coincides with said pivot point when the respective set of readings of locations of said predesignated points is to be obtained therefrom.

5. In a process for determining the coordinates of preselected points on a chart in a predesignated coordinate system for said chart, the steps of pivoting a graduated scale across the face of the chart through a plane parallel thereto about a pivot point external to the chart to produce an apparent intersection between the scale and one of said preselected points, recording the scale reading at which said one point intersects said scale, repeating the steps of pivoting said scale and recording until the entire set of scale readings corresponding to the set of said preselected points has been obtained, relatively rotating said chart and said scale about the center of said chart to change the position of said scale pivot point relative to said chart for placement at a diverent location external to said chart, through increments of less than 360°, and repeating the steps of pivoting said scale and recording observations until the entire set of scale readings for said preselected points has been obtained for each of the incremental locations corresponding to a new pivot point, the pivot points for which said steps of pivoting and recording are performed being at least three in number, the preselected points being sufficient in number to provide a system of simultaneous equations in coordinates of said preselected points and of said pivot points wherein the number of equations is at least equal to the number of unknown coordinates, for said predesignated coordinate system.

6. The process of claim 5 wherein said chart is generally rectangular in form and said increments are 90 degree segments to provide distinct pivot points for said scale near the midsides of the chart.

7. Apparatus for determining the coordinates of stations on a chart, comprising a frame, a chart holder for said frame, a longitudinal scale coupled to said frame for pivoting about a point external to said chart near the midpoint of a side thereof, arcuate guide means on said frame encompassing at least a portion of said chart holder for supporting said scale for superposed movement through a plane parallel to the plane of the chart across the face of said chart about said pivot point, a microscope translatable longitudinally of said scale for superpositioning relative to a selected station on said chart, micrometer means disposed adjacent an end of said scale for incrementally translating said scale along its longitudinal axis relative to the selected station, said chart holder being removable from said frame for rotation to a plurality of distinct and different positions about the center point of the chart to effectively provide a different pivot point for said scale relative to said chart for each of the chart holder positions, and means for fixedly maintaining said chart holder in each of said positions relative to said frame and said scale.

References Cited

UNITED STATES PATENTS

| 3,184,740 | 5/1965 | Huckabay et al. | 33—1 |
| 3,184,847 | 5/1965 | Rosen | 33—1 |
| 3,230,622 | 1/1966 | Birrell | 33—1 |

FOREIGN PATENTS 783,474   9/1957   Great Britain.

WILLIAM D. MARTIN, JR., Primary Examiner

U.S. Cl. X.R.

33—75